Patented Mar. 7, 1950

2,499,629

UNITED STATES PATENT OFFICE 2,499,629

PHOTOCHEMICAL MANUFACTURE OF 1,1,1-DIFLUOROCHLOROETHANE

John D. Calfee, Manhasset, N. Y., and Lee B. Smith, Woodbridge, N. J., assignors to Allied Chemical & Dye Corporation, a corporation of New York No Drawing. Application March 16, 1946, Serial No. 655,012

4 Claims. (Cl. 204—163)

This invention relates to manufacture of 1,1,1-difluorochloroalkanes such as 1,1,1-difluorochloroethane, $CH_3CF_2Cl$, a non-toxic, moderately flammable gas (B. P. minus 9.6° C.) especially useful as a refrigerant and as an intermediate in other processes. The present improvements are herein described in connection with the chlorination of ethylidene fluoride, $CH_3CHF_2$, to form 1,1,1-difluorochloroethane.

It has been proposed to make fluoro and fluorohalo aliphatic hydrocarbons by reacting halogenated aliphatic hydrocarbons, containing halogen other than fluorine, with a fluorinating agent such as antimony trifluoride, and several fluoro and fluorohalo derivatives of aliphatic hydrocarbons have been prepared by this general method. Henne et al. report (J. Am. Chem. Soc., 58, 889, 1936) preparation of 1,1,1-difluorochloroethane in accordance with the foregoing principles using 1,1,1-trichloroethane as the halogenated hydrocarbon and antimony trifluoride in the presence of an antimony pentahalide as fluorinating agent. These procedures have the marked disadvantages of inherent side reactions which include splitting out of HF from the starting material. Further, it is well known in the chlorination art in general that the commercially important disadvantage lies in the fact that the amount of the monochlorinated material produced is extremely low because of the unavoidable formation of large amounts of polychlorinated side reaction products. Hence, prior art knowledge points away from the possibility of effecting commercially satisfactory mono-chlorination of 1,1-difluoroalkanes such as ethylidene fluoride to introduce a chlorine atom into the carbon atom already bearing the two fluorine atoms.

The principal object of this invention is provision of processes by practice of which it is possible to obtain high commercially satisfactory yields of 1,1,1-difluorochloroalkane derivatives of 1,1-difluoroalkanes such as ethylidene fluoride.

Applied to the manufacture of 1,1,1,-difluorochloroethane, practice of the invention involves effecting reaction of ethylidene fluoride and chlorine by actinic radiation.

The reaction taking place may be represented by the following equation—

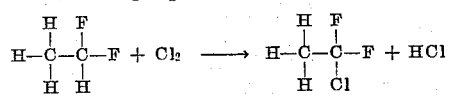

Essentially, this reaction is a substitution halogenation of a 1,1-dihalo derivative of a saturated aliphatic hydrocarbon.

This invention is based on the discovery that when ethylidene fluoride and not substantially more than one molecular proportion of chlorine are subjected to the action of actinic radiation (to the action of any light which effects chemical change) there is substantially immediately produced a gaseous reaction mixture comprising a recoverable mixture of reacted materials containing by weight a predominating amount of 1,1,1-difluorochloroethane. Under moderately favorable conditions of operation, such recoverable mixtures of reacted materials contain by weight not less than 80%, usually about 80–95% of 1,1,1-difluorochloroethane, and yields of the desired monochlorinated product are 60% and higher. The term "yield" is used herein to denote the percent by weight of ethylidene fluoride input which is recovered as 1,1,1-difluorochloroethane.

We have discovered that the foregoing is true whether the reaction is effected in the presence of substantially less than one, one, or not substantially more than one molecular proportion of chlorine. The invention comprises the discovery of this inherent reaction characteristic which is surprisingly distinguishable from the expectation that chlorination would proceed, as indicated by the prior art, to formation of a predominating amount of polychlorinated end products. Also, it is surprising that the recoverable product should be almost exclusively the 1,1,1-compound rather than a mixture of the 1,1,1- and 1,1,2-isomers. Further, we find that the resulting reaction mixture is relatively stable and that the contained 1,1,1-difluorochloroethane is recoverable as such by commercially feasible methods without the taking place of further chlorination and its attendant production of further amounts of polychlorinated or other undesirable side reaction products.

Applied to manufacture of 1,1,1-difluorochloroethane, the invention particularly comprises subjecting a mixture of ethylidene fluoride and not substantially more than one molecular proportion of chlorine to the action of actinic radiation, and recovering a mixture of reacted materials containing by weight a predominating amount, usually 80% and up, of 1,1,1-difluorochloroethane.

We have found that recovery of the mixture of reacted materials containing maximum quantities of the desired monochlorinated derivative and minimum quantities of polychlorinated and other undesirable side reaction products may be had easily by regulating the amount of chlorine present in the reaction to not substantially more than one molecular proportion whereby there is produced the described large amounts of 1,1,1-difluorochloroethane in a reacted mixture which may be immediately discharged from the reaction zone or retained therein indefinitely, the time of retention of the reaction mixture in the reaction zone being a factor of economic consideration but of no chemically critical importance. The invention process is readily adaptable to a continuous operation in which chlorine and ethylidene fluoride are continuously introduced into a reaction zone, subjected therein to the action of actinic radiation, and the resulting reaction mixture continuously discharged from the reaction zone, a specific discovery of the invention being that when the indicated proportions of raw materials are continuously introduced into a reaction zone, subjected to the action of actinic radiation therein, and the resulting reaction mixture continuously discharged, there is formed a reaction zone gaseous effluent comprising a mixture of reacted materials containing by weight a predominating amount, usually 80% and up, of 1,1,1 difluorochloroethane.

The reaction may be carried out conveniently by passing the starting materials into and thru a glass enclosed reaction space, such as the annular space formed by surrounding a fluorescent light tube with a glass tube of larger diameter. Any form of light which effects chemical reaction may be employed, such as diffused daylight, infrared rays, ultra-violet, ordinary incandescent lamps, although fluorescent light is preferred.

We have found that good conversion of ethylidene fluoride depends upon space velocity per hour (volumes of reactant gas at room temperature per volume of reaction chamber per hour), ethylidine fluoride to chlorine mol ratio, light intensity, temperature, and substantial absence of oxygen in the reaction mixture. The term "conversion" indicates the percentage by weight of starting material which reacts during the course of the reaction. Space velocity per hour should be preferably not more than 600 and ordinarily in the range of 200 to 300. In the preferred embodiments of the invention, approximately one molecular proportion of chlorine is employed. When so proceeding, practically all of the chlorine is utilized in the reaction, and the amount of chlorine escaping the reaction zone is so small that disposal of such unreacted chlorine to waste affords no economic disadvantage. The reaction is exothermic although not highly so. In most operations, particularly using fluorescent light, temperature control of the reactors has been unnecessary, since temperatures automatically maintain themselves within the range from about room temperature to about 300° C. Should operations be of such character as to develop undue amounts of heat, any suitable cooling means to keep temperature below about 300° C. may be employed. The reaction proceeds in the presence of any amount of actinic radiation, although the speed of reaction appears to be directly proportional to the intensity of light. We find that oxygen inhibits the chlorination reaction, and in practice the process is carried out under conditions such that the reaction is effected in the presence of less than 0.1% by weight of oxygen based on the amount of ethylidene fluoride charged.

Exit gases from the reactor may be purified and the sought-for 1,1,1-difluorochloroethane recovered in any satisfactory manner. For example, the effluent of the reactor may be passed first thru a water scrubber which removes from the gas stream most of the HCl, then thru a scrubber which may contain a suitable aqueous caustic soda solution, e. g. one having an NaOH strength in the range of 10 to 20%. In this scrubber the unreacted chlorine and the last traces of HCl are removed from the gas stream. Thereafter, the gas may be passed thru a suitable dryer such as a column of silica gel or calcium chloride. There is thus produced a gas stream which contains principally $CH_3CF_2Cl$, unreacted $CH_3CHF_2$, and some $CH_2ClCHF_2$, $CH_2ClCF_2Cl$, and $CHCl_2CHF_2$. The constituents of this gas may be totally liquefied in a suitable receiver by cooling to well below minus 24.7° C., the boiling point of ethylidene fluoride. The receiver may be transferred to a still, temperature of liquid raised to about minus 24–25° C. to distill off the $CH_3CHF_2$ which may be recycled to the reactor. The residual liquid in the still is a mixture of reacted materials which mixture, as indicated by the following examples, may contain 84–92% by weight of 1,1,1-difluorochloroethane.

The temperature of the liquid in the still may be raised sufficiently to distill off an overhead which, when condensed is a liquid having a boiling point of minus 9.6° C. ± 0.5° C., i. e. the sought-for 1,1,1-difluorochloroethane product. This leaves in the still, a residue comprising chiefly $CH_2ClCHF_2$, boiling at about 35° C., $CH_2ClCF_2Cl$ boiling at about 47° C., and $CHCl_2CHF_2$ boiling at about 60° C. The still residue may also contain relatively small amounts of other polychlorinated products all of which have boiling points above about 60° C.

In the following examples all "parts" are parts by weight, and the term "yield" is used to designate the percent by weight of ethylidene fluoride input which was recovered as 1,1,1-difluorochloroethane. In all instances the ethylidene fluoride and chlorine were fed into the reactors at room temperature and at pressure sufficiently above atmospheric to force the gases thru the train of apparatus. Temperatures in all examples were less than about 300° C. and were generally in the range of 150–250° C.

*Example 1*

A feed gas mixture consisting of 77 parts of ethylidene fluoride and 43 parts of chlorine was fed continuously into one end of a tubular transparent quartz reactor 10″ long and having an inside diameter of 1¾″, the reactor and the mixture therein being exposed to the light generated by an adjacent mercury arc. The ethylidene fluoride and the chlorine were fed into the reactor at the respective rates of 0.00629 and 0.00346 cubic foot per minute, and rate of flow of the gas mixture thru the reactor was about 42 space velocity per hour. Molecular proportions of ethylidene fluoride to chlorine actually passed thru the reactor throughout the run were one to 0.55. The reaction was exothermic, heat was generated, but no extraneous cooling was used. The reactor gas mixture was continuously discharged from the reactor and was bubbled thru water to remove most of the HCl, then bubbled thru a caustic soda solution of NaOH strength of about 20% to remove unreacted chlorine and the last traces of HCl, and the gas stream was thereafter dried by passing the same thru a column of calcium chloride. Following these operations, the gas stream was passed into a receiver packed in a mixture of dry ice and a little acetone to facilitate heat transfer. Gaseous constituents of the gas stream were condensed at temperature of about minus 78° C. At the end of the run, the receiver was transferred to a fractioning still, and the temperature of the liquid material was raised to about minus 25° C. Overhead distillate was condensed and there were recovered 35.1 parts of material having a boiling point of about minus 24-25° C., recognized boiling point of ethylidene fluoride being minus 24.5° C. Temperature of the residual liquid in the still was then raised to about minus 10° C. Overhead distillate was condensed and there were recovered 35.7 parts of condensate having a boiling point in the range of minus 9 to 10° C., recognized boiling point of 1,1,1-difluorochloroethane being minus 9.6° C. The yield of 1,1,1-difluorochloroethane was about 30.4%.

*Example 2*

A feed gas mixture consisting of 101 parts of ethylidene fluoride and 37 parts of chlorine was fed continuously into one end of a tubular Pyrex glass reactor 10″ long and having an inside diameter of 1⅝″, the reactor and the mixture therein being exposed to the light generated by an adjacent 300 watt tungsten lamp in a reflector. A light reflector was placed adjacent the reactor diametrically opposite the lamp. The ethylidene fluoride and the chlorine were fed into the reactor at the respective rates of 0.00629 and 0.00213 cubic foot per minute, and rate of flow of the gas mixture thru the reactor was about 65 space velocity per hour. Molecular proportions of ethylidene fluoride to chlorine actually passed thru the reactor throughout the run were one to 0.34. The reaction was exothermic, heat was generated, but no extraneous cooling was used. The reacted gas mixture was continuously discharged from the reactor and was bubbled thru water to remove most of the HCl. The gas stream was passed into a first receiver packed in a mixture of dry ice and a little acetone. The gaseous constituents of the gas stream were condensed at temperature of about minus 78° C. At the end of the run, the receiver was transferred to a still, and the liquid content of the receiver completely vaporized. The resulting vapor was bubbled thru a caustic soda solution of NaOH strength of about 20% to remove unreacted chlorine and the last traces of HCl, and the gas stream was thereafter dried by passing the same thru a column of calcium chloride. Following these operations, the gas stream was passed into a second receiver packed in a mixture of dry ice and a little acetone. Gaseous constituents of the gas stream were condensed at temperature of about minus 78° C. The second receiver was transferred to a fractionating still, and the temperature of the liquid material was raised to about minus 25° C. Overhead distillate was condensed and there were recovered 25.8 parts of material having a boiling point of about minus 24-25° C., i.e ethylidene fluoride. Temperature of the residual liquid in the still was then raised to about minus 10° C. Overhead distillate was condensed and there were recovered 13 parts of condensate having a boiling point in the range of minus 9 to 10° C., i.e. 1,1,1-difluorochloroethane. The yield of 1,1,1-difluorochloroethane was about 8.4%.

*Example 3*

A feed gas mixture consisting of 111 parts of ethylidene fluoride and 100 parts of chlorine was fed continuously into the same reactor as in Example 2. The ethylidene fluoride and the chlorine were fed into the reactor at the respective rates of 0.00629 and 0.00528 cubic foot per minute, and rate of flow of the gas mixture thru the reactor was about 88 space velocity per hour. Molecular proportions of ethylidene fluoride to chlorine actually passed thru the reactor throughout the run were one to 0.84. The reaction was exothermic, heat was generated, but no extraneous cooling was used. The reacted gas mixture was continuously discharged from the reactor, and purified as in Example 2. The second receiver was transferred to a fractionating still, and the temperature of the liquid material was raised to about minus 25° C. Overhead distillate was condensed and there were recovered 11.3 parts of material having a boiling point of about minus 24-25° C., i.e. ethylidene fluoride. Temperature of the residual liquid in the still was then raised to about minus 10° C. Overhead distillate was condensed and there were recovered 70.1 parts of condensate having a boiling point in the range of minus 9 to 10° C., i.e. 1,1,1-difluorochloroethane. There remained in the still 13 parts of higher boiling fractions. The yield of 1,1,1-difluorocholoroethane was about 41%, about 47.2% by weight of the ethylidene fluoride input was recovered as reacted material, and of the reacted material recovered about 84.4% by weight was recovered as 1,1,-1-difluorochloroethane.

*Example 4*

A feed gas mixture consisting of 131 parts of ethylidene fluoride and 123 parts of chlorine was fed continuously into one end of an annular reactor formed by a Pyrex glass jacket of 34 mm. inside diameter and 381 mm. length surrounding a 15 watt fluorescent light tube having an outside diameter of 26 mm. The reactor was provided with inlet and outlet openings at opposite ends, had a volume of 144 cc., and the jacket was wrapped on the outside with aluminum foil. The ethylidene fluoride and the chlorine were fed into the reactor at the respective rates of 0.00445 and 0.00392 cubic foot per minute, and rate of flow of the gas mixture thru the reactor was about 128 space velocity per hour. Molecular proportions of ethylidene fluoride to chlorine actually passed thru the reactor throughout the run were one to 0.88. The reaction was exothermic, heat was generated, but no extraneous cooling was used. The reacted gas mixture was continuously discharged from the reactor and was bubbled thru water to remove most of the HCl, then bubbled thru a caustic soda solution of NaOH strength of about 20% to remove unreacted chlorine and the last traces of HCl, and the gas stream was thereafter dried by passing the same thru a column of calcium chloride. Following these operations, the gas stream was passed into a receiver packed in a mixture of dry ice and a little acetone. Gaseous constituents of the gas stream were condensed at temperature of about minus 78° C. The receiver was transferred to a fractionating still, and the temperature of the liquid material was raised to about minus 25° C. Overhead distillate was condensed and there were recovered 19 parts of material having a boiling point of about minus 24-25° C., i. e. ethylidene fluoride. Temperature of the residual liquid in the still was then raised to about minus 10° C. Overhead distillate was condensed, and there were recovered 132 parts of condensate having a boiling point in the range of minus 9 to 10° C., i. e. 1,1-difluorochloroethane. There remained in the still 12 parts of higher boiling fractions. The yield of 1,1,1-difluorochloroethane was about 66.4%, about 71% by weight of the ethylidene fluoride input was recovered as reacted material, and of the reacted material recovered about 91.7% by weight was recovered as 1,1,1-difluorochloroethane. Chlorine utilization was 92%.

*Example 5*

A feed gas mixture consisting of 229 parts of ethylidene fluoride and 249 parts of chlorine was fed continuously into one end of the reactor of Example 4. The ethylidene fluoride and the chlorine were fed into the reactor at the respective rates of 0.01085 and 0.01085 cubic foot per minute, and rate of flow of the gas mixture thru the reactor was about 256 space velocity per hour. Molecular proportions of ethylidene fluoride to chlorine actually passed thru the reactor throughout the run were one to 1.003. The reaction was exothermic, heat was generated, but no extraneous cooling was used. The reacted gas mixture was continuously discharged from the reactor, and purified as in Example 4. The receiver was transferred to a fractionating still, and the temperature of the liquid material was raised to about minus 25° C. Overhead distillate was condensed and there were recovered 29.3 parts of material having a boiling point of about minus 24–25° C., i. e. ethylidene fluoride. Temperature of the residual liquid in the still was then raised to about minus 10° C. Overhead distillate was condensed and there were recovered 254.5 parts of condensate having a boiling point in the range of minus 9 to 10° C., i. e. 1,1,1-difluorochloroethane. There remained in the still 28.3 parts of higher boiling fractions. The yield of 1,1,1-difluorochloroethane was about 60%, about 66% by weight of the ethylidene fluoride input was recovered as reacted material, and of the reacted material recovered about 90.0% by weight was recovered as 1,1,1-difluorochloroethane. Chlorine utilization was about 90%.

*Example 6*

A feed gas mixture consisting of 1354 parts of ethylidene fluoride and 1654 parts of chlorine was fed continuously into one end of the reactor of Example 4. The ethylidene fluoride and the chlorine were fed into the reactor at the respective rates of 0.01020 and 0.01151 cubic foot per minute, and rate of flow of the gas mixture thru the reactor was about 256 space velocity per hour. Molecular proportions of ethylidene fluoride to chlorine actually passed thru the reactor throughout the run were one to 1.13. The reaction was exothermic, heat was generated but no extraneous cooling was used. The reacted gas mixture was continuously discharged from the reactor, and was bubbled twice thru water to remove most of the HCl, then bubbled thru a caustic soda solution of NaOH strength of about 15% to remove unreacted chlorine and the last traces of HCl, and the gas stream was thereafter dried by passing the same thru a column of calcium chloride. Following these operations, the gas stream was passed into a receiver packed in a mixture of dry ice and a little acetone. Gaseous constituents of the gas stream were condensed at temperature of about minus 78° C. The receiver was transferred to a fractionating still, and the temperature of the liquid material was raised to about minus 25° C. Overhead distillate was condensed and there were recovered 291 parts of material having a boiling point of about minus 24–25° C., i. e., ethylidene fluoride. Temperature of the residual liquid in the still was then raised to about minus 10° C. Overhead distillate was condensed and there were recovered 1430 parts of condensate having a boiling point in the range of minus 9 to 10° C., i. e. 1,1,1-difluorochloroethane. There remained in the still 212 parts of higher boiling fractions. The yield of 1,1,1-difluorochloroethane was about 69.4%, about 77.1% by weight of the ethylidene fluoride input was recovered as reacted material, and of the reacted material recovered about 87.1% was recovered as 1,1,1-difluorochloroethane. Chlorine utilization was about 74.5%.

*Example 7*

A feed gas mixture consisting of 550 parts of ethylidene fluoride and 617 parts of chlorine was fed continuously into one end of the reactor of Example 4. The ethylidene fluoride and the chlorine were fed into the reactor at the respective rates of 0.02204 and 0.02263 cubic foot per minute, and rate of flow of the feed gas mixture thru the reactor was about 525 space velocity per hour. Molecular proportions of ethylidene fluoride to chlorine actually passed thru the reactor throughout the run were one to 1.04. The reaction was exothermic, heat was generated, but no extraneous cooling was used. The reacted gas mixture was continuously discharged from the reactor, and was bubbled twice thru water to remove most of the HCl, then bubbled thru a caustic soda solution of NaOH strength of about 15% to remove unreacted chlorine and the last traces of HCl, and the gas stream was thereafter dried by passing the same thru a column of calcium chloride. Following these operations, the gas stream was passed into a receiver packed in a mixture of dry ice and a little acetone. Gaseous constituents of the gas stream were condensed at temperature of about minus 78° C. The receiver was transferred to a fractionating still, and the temperature of the liquid material was raised to about minus 25° C. Overhead distillate was condensed and there were recovered 160 parts of material having a boiling point of about minus 24–25° C., i. e. ethylidene fluoride. Temperature of the residual liquid in the still was then raised to about minus 10° C. Overhead distillate was condensed and there were recovered 521 parts of condensate having a boiling point in the range of minus 9 to 10° C., i. e. 1,1,1-difluorochloroethane. There remained in the still 88 parts of higher boiling fractions. The yield of 1,1,1-difluorochloroethane was about 60.2%, about 70% by weight of the ethylidene fluoride input was recovered as reacted material, and of the reacted material recovered about 85.6% by weight was recovered as 1,1,1-difluorochloroethane. Chlorine utilization was about 74.5%.

From the above examples it will be noted that, under moderately favorable operating conditions, the recovered mixtures of reacted materials (i. e. the mixture of reacted materials obtained after removal of unreacted ethylidene fluoride) contained by weight from about 84% to about 92% of 1,1,1-difluorochloroethane, and that such mixtures contained by weight from about 16% to about 8% of higher boiling polychlorinated and other undesired monochlorinated products.

We claim:

1. The process of preparing 1,1,1-difluorochloroethane which comprises continuously introducing ethylidene fluoride and chlorine into a reaction zone, regulating the amount of chlorine to provide in said zone about one molecular proportion of chlorine, subjecting the material in said zone to actinic radiation while maintaining a temperature in the range from about room temperature to about 300° C. and a space velocity per hour in the range of 200–300, continuously discharging the resulting reaction mixture, and recovering a mixture of reacted materials containing by weight not less than 80% of 1,1,1-difluorochloroethane.

2. The process which comprises subjecting a mixture of ethylidene fluoride and not substantially more than one molecular proportion of chlorine to actinic radiation while maintaining a temperature in the range of from about room temperature to about 300° C. to thereby produce 1,1,1-difluorochloroethane.

3. The process which comprises subjecting a mixture of ethylidene fluoride and about one molecular proportion of chlorine to actinic radiation while maintaining a temperature in the range of from about room temperature to about 300° C. to thereby produce 1,1,1-difluorochloroethane.

4. The process for preparing 1,1,1-difluorochloroethane which comprises continuously introducing ethylidene fluoride with not substantially more than one molecular proportion of chlorine into a reaction zone, subjecting the material therein to actinic radiation while maintaining a temperature in the range of from about room temperature to about 300° C. and a space velocity per hour not more than 600, continuously discharging the resulting reaction mixture from said zone, and recovering 1,1,1-difluorochloroethane.

JOHN D. CALFEE.
LEE B. SMITH.

REFERENCES CITED

The following references are of record in the file of this patent:

Hass et al., Industrial and Engineering Chemistry, March 1936, pp. 333–339.

Henne et al., Journal American Chemical Society, vol. 61 (1939), pp. 938–940.

Henne et al., Journal American Chemical Society, vol. 63 (1941), pp. 2692–94.

Henne et al., Journal American Chemical Society, vol. 64 (1942), pp. 1157–59.

Henne et al., Journal American Chemical Society, vol. 67 (1945), pp. 1906–8.